(12) United States Patent
Jendrichowski et al.

(10) Patent No.: US 8,918,980 B2
(45) Date of Patent: Dec. 30, 2014

(54) BEVERAGE BOTTLE HANDLING MACHINE CONSTRUCTION METHOD

(75) Inventors: Klaus Jendrichowski, Holzwickede (DE); Ulrich Wiedemann, Dortmund (DE)

(73) Assignee: KHS GmbH, Dortmund (DE)

( * ) Notice: Subject to any disclaimer, the term of this patent is extended or adjusted under 35 U.S.C. 154(b) by 1410 days.

(21) Appl. No.: 12/605,025

(22) Filed: Oct. 23, 2009

(65) Prior Publication Data

US 2010/0269322 A1 Oct. 28, 2010

Related U.S. Application Data

(63) Continuation-in-part of application No. PCT/EP2008/002138, filed on Mar. 18, 2008.

(30) Foreign Application Priority Data

Apr. 23, 2007 (DE) .......................... 10 2007 019 378

(51) Int. Cl.
| | |
|---|---|
| *B21J 15/02* | (2006.01) |
| *B23Q 3/18* | (2006.01) |
| *B23K 37/04* | (2006.01) |
| *B23K 37/047* | (2006.01) |
| *B23P 19/10* | (2006.01) |

(52) U.S. Cl.
CPC ............. *B23K 37/0443* (2013.01); *B23P 19/10* (2013.01)
USPC .................... 29/464; 29/466; 29/467; 29/468; 29/469; 29/524.1; 29/525.06; 29/525.13; 29/525.14; 228/4.1; 228/6.1

(58) Field of Classification Search
USPC .............. 29/464, 466, 467, 468, 469, 897.31, 29/897.312, 525.13, 525.14, 524.1, 29/525.06; 219/121.64, 121.69, 121.14; 228/4.1, 6.1, 101, 175, 176, 177, 227, 228/228, 229, 230

See application file for complete search history.

(56) References Cited

U.S. PATENT DOCUMENTS

| | | | |
|---|---|---|---|
| 2,738,866 | A | 3/1956 | Vamvakas et al. |
| 5,035,046 | A | 7/1991 | Cowing |

(Continued)

FOREIGN PATENT DOCUMENTS

| | | |
|---|---|---|
| DE | 34 33 445 A1 | 3/1986 |
| DE | 101 58 264 C1 | 10/2002 |

(Continued)

OTHER PUBLICATIONS

International Search Report PCT/EP2008/002138 and English translation thereof.

(Continued)

*Primary Examiner* — Jermie Cozart
(74) *Attorney, Agent, or Firm* — Nils H. Ljungman & Associates

(57) ABSTRACT

A beverage bottle handling machine construction method for constructing a beverage bottle handling machine, such as a beverage bottle cleaning machine, a beverage bottle pasteurization machine, and a beverage bottle shrink wrap machine in a beverage bottling plant. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

11 Claims, 4 Drawing Sheets

(56) References Cited

U.S. PATENT DOCUMENTS

| | | |
|---|---|---|
| 6,668,438 B2 | 12/2003 | Sato et al. |
| 2006/0283015 A1 | 12/2006 | Lowe et al. |

FOREIGN PATENT DOCUMENTS

| | | |
|---|---|---|
| EP | 1 008 510 A | 6/2000 |
| EP | 1541455 | 6/2005 |
| GB | 1 601 603 A | 11/1981 |
| GB | 2 427 175 A | 12/2006 |
| JP | 50150653 | 12/1975 |
| JP | 4256582 | 9/1992 |
| JP | 11058047 | 3/1999 |
| JP | 2000043767 | 2/2000 |
| JP | 2002178186 | 6/2002 |
| JP | 2003062692 | 3/2003 |
| JP | 2005510367 | 4/2005 |

OTHER PUBLICATIONS

German Search Report 10 2007 019 378.7.

BEVERAGE BOTTLE HANDLING MACHINE CONSTRUCTION METHOD

CONTINUING APPLICATION DATA

This application is a Continuation-In-Part application of International Patent Application No. PCT/EP2008/002138, filed on Mar. 18, 2008, which claims priority from Federal Republic of Germany Patent Application No. 10 2007 019 378.7, filed on Apr. 23, 2007. International Patent Application No. PCT/EP2008/002138 was pending as of the filing date of this application. The United States was an elected state in International Patent Application No. PCT/EP2008/002138.

BACKGROUND

1. Technical Field

The present application pertains to a fabrication method for machines, in one possible embodiment machines for the beverage industry like cleaning machines, pasteurization machines, shrink wrap tunnels or the like, wherein the structural parts of the machine are put together from individual parts by welding methods and by detachable connections. In this process, a holding device not belonging to the machine is prepared, to which a first side wall is fastened, then a second opposite side wall is positioned at a distance, being slightly more than the distance between the side walls when fully assembled. In the next step, middle inserts are placed between the side walls, at least one of the side walls having support elements by which at least some of the middle inserts can be held and/or supported by them. Finally, the holding devices are moved closer together, so that the machine is closed up and can then be welded by means of laser or electron beam welding methods.

2. Background Information

Background information is for informational purposes only and does not necessarily admit that subsequently mentioned information and publications are prior art.

Some machines are put together from a prefabricated frame. The machine frame here is secured in the major geometries in three spatial directions. The machine parts, subassemblies, bottoms, motors, etc., are placed into this frame and connected to the frame itself in detachable or permanent manner. Furthermore, most of the subassemblies and installed parts are welded to each other and to the side walls.

This is a proven fabrication technique, but it has the drawback that it is difficult to perform work in the rigid machine frame, and the work space becomes progressively more narrow as the work makes progress. Moreover, the cube-shaped basic frame is a major limitation on the prefabrication and installation of more complex subassemblies. Most of the installed parts therefore have to be put together inside the basic frame. This is time consuming and difficult for the installation workers.

OBJECT OR OBJECTS

Hence, an object of the present application is to eliminate, restrict, and/or minimize this drawback and provide a fabrication method enabling a simplified and faster assembly.

SUMMARY

This problem is solved in the present application by a method for fabrication of machines, in one possible embodiment machines for the beverage industry like cleaning machines, pasteurization machines, shrink wrap tunnels or the like, which are suitable in one possible embodiment for the treatment of containers like bottles, cans, glasses and the like. The structural parts of the machine are put together from individual parts or smaller subassemblies by welding methods and/or by detachable connections, wherein at least the following steps are carried out:

a) preparing of a holding device not belonging to the machine, by means of which one of the side walls of the machine can be supported or carried, b) constructing and erecting at least one part of a first side wall of the machine, c) constructing and erecting at least one part of a second, opposite side wall of the machine at a distance which is slightly larger than the distance between the side walls when assembly is complete, d) positioning of middle structural parts between the side walls, at least one of the side walls having support elements by means of which at least some of the middle inserts can be held and/or carried by them (installation step), e) closing up the machine by pressing together the opposite side surfaces spanned by the middle inserts (closure step), and f) welding at least some of the middle inserts to the side surfaces, in one possible embodiment using a laser or electron beam welding method.

In the context of this method and the device, by middle inserts and/or middle insert parts is meant elements which are essentially self-supporting and span the distance from one side wall to the other or to the support elements provided there. The other static or movable inserts that are found in such a method and machine are not more closely discussed or mentioned hereafter.

One improvement comprises in that the middle inserts in step d) are first fastened to one of the two side walls. This can be done by suitable screw or rivet connections, as well as a suitable welding method. To avoid, restrict, and/or minimize deformations caused by heat, in one possible embodiment a beam method is used, such as a laser welding method. In the region of the opposite side wall, which is a slight distance away from the free ends of the middle inserts, the middle insert parts lie loosely on the support elements provided there. In this way, the work area remains freely accessible till the end of the assembly in step f) and additional middle inserts can easily be added and joined and/or welded together. The one-sided fastening of the middle inserts to the first side wall can be done selectively and/or time-staggered. For example, very large and heavy middle inserts can be welded on and after the closure step remaining middle inserts can be welding in a continuous welding process.

In at least one possible embodiment of the present application, at least some of the weld connections are made from the outside through the side wall, by welding from the outside the middle inserts lying in abutment or plane parallel or substantially parallel inside the machine through the containment wall, to it and/or to each other. In this way, the assembly is further accelerated, so that many weld processes can be done from the outside in an easily accessible position and/or in mechanized fashion.

To achieve a very low-material, lightweight construction, in a further variant of the method the first side wall is formed from essentially two parallel or substantially parallel elements. These comprise an inner wall and an outer wall, which are spaced apart and joined together by webs. In at least one possible embodiment, the inner wall has a plurality of recesses and openings, through which the support elements can be passed through and/or the inner and outer wall can be joined together. The support elements project into the inner space of the machine, so that the middle inserts can be carried and/or supported per step d).

In at least one possible embodiment of the present application, the support elements are fastened to the outer wall in a first step or to join it to this and then shove the inner wall onto the support elements.

In one possible embodiment of the method, recesses and openings are produced in the side walls by means of a beam method and in one possible embodiment by means of electron beam or laser methods. These laser or electron beam methods of material cutting are very exact or substantially exact, so that little or no aftermachining is required and/or desired and the semifabricated pieces coming from an automatic production process can be directly installed.

To improve the setup and check on the installation, it is helpful, prior to the installation in step b) and/or c), to apply dimensional marks and/or scored lines on one of the side walls by means of an electron beam and/or laser beam method. This can be done in the same work step as the beam cutting of openings and recesses and thus slightly lengthens the machining process.

In one optimized variant of the method, the middle inserts are prefabricated as much as possible from components comprises several or a plurality of individual parts. In one possible embodiment, gas and/or liquid conducting intermediate bottoms can be mounted as finished structural parts. Small openings in the side surfaces, which may need to be provided or should be provided to house support elements, are afterwards welded tight from the outside through the side wall.

The special merit of the present method is that the middle inserts and other inserted parts of the machine can be installed essentially one after the other from bottom to top and the head space remains accessible until the closure step, so that supporting lifting and crane-operated tools can be used.

The present application also involves a machine for the beverage industry and food industry, in one possible embodiment a cleaning machine, a pasteurization machine, a shrink wrap tunnel or the like, which are in one possible embodiment suited for the treatment of containers like bottles, cans, small kegs, glasses and the like. This includes at least one segment which has been fabricated according to one of the foregoing method variants. In at least one possible embodiment of the present application, the machine comprises several segments, which have been fabricated at the same time or in succession by a method according to one of the aforementioned claims.

This machine has a plurality of support elements, on which at least one part of the middle inserts lie or are supported by at least one partial surface. In one variant of the machine, at least some of the support elements have a web region and a bracket region, while in one possible embodiment the support elements have at least one thread or a rivet head at one end.

Furthermore, the present application involves a device for the fabrication of machines for the beverage industry and food industry, in one possible embodiment a cleaning machine, a pasteurization machine, a shrink wrap tunnel or the like, which are suited, e.g., for the treatment of containers like bottles, cans, glasses and the like, by which it is possible to carry out one of the aforementioned method variants. For this, the device has a foot element and one side support frame for a single or double side wall of the machine. Furthermore, an assembly template is placed on the at least one support frame, on which at least one bracket or support element is arranged, in order to attach the side wall.

Alternatively, the device has precisely or substantially precisely two opposite support frames and at least one foot element to accommodate two side walls. For this, in one possible embodiment one assembly template is likewise placed on the second support frame, on which at least one bracket or support element is arranged, there being in one possible embodiment a plurality of bracket or support elements.

The merit of assembly templates is that different machines or machine sections/segments can be mounted on the very same support frame or pair of support frames, being provided with corresponding assembly templates.

In order to move up the side walls in the closure step and close the gaps at the free ends of the middle inserts, one support frame or at least one of the support frames may move. Alternatively, at least one of the assembly templates can be mounted on the support frame or frames with ability to move.

In at least one possible embodiment of the present application, the one support frame or at least one of the support frames may be guided on at least one rail.

The fabrication method, the machine and the fabrication device of the present application are explained by the foregoing example, without being limited to one possible embodiment.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
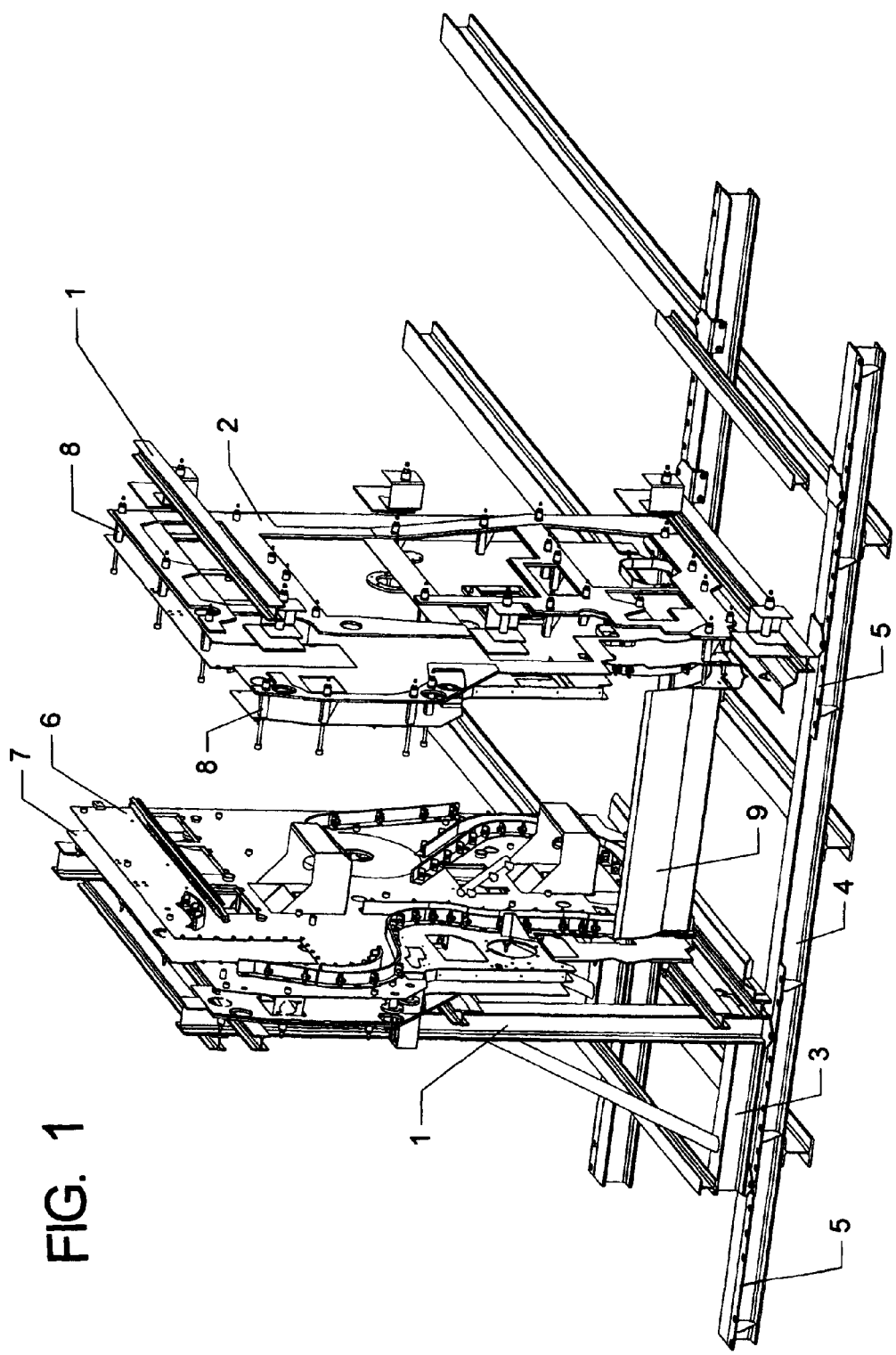
FIG. 1 shows a perspective representation of the support frame at the start of the assembly step for a cleaning machine.
Figure 1A:
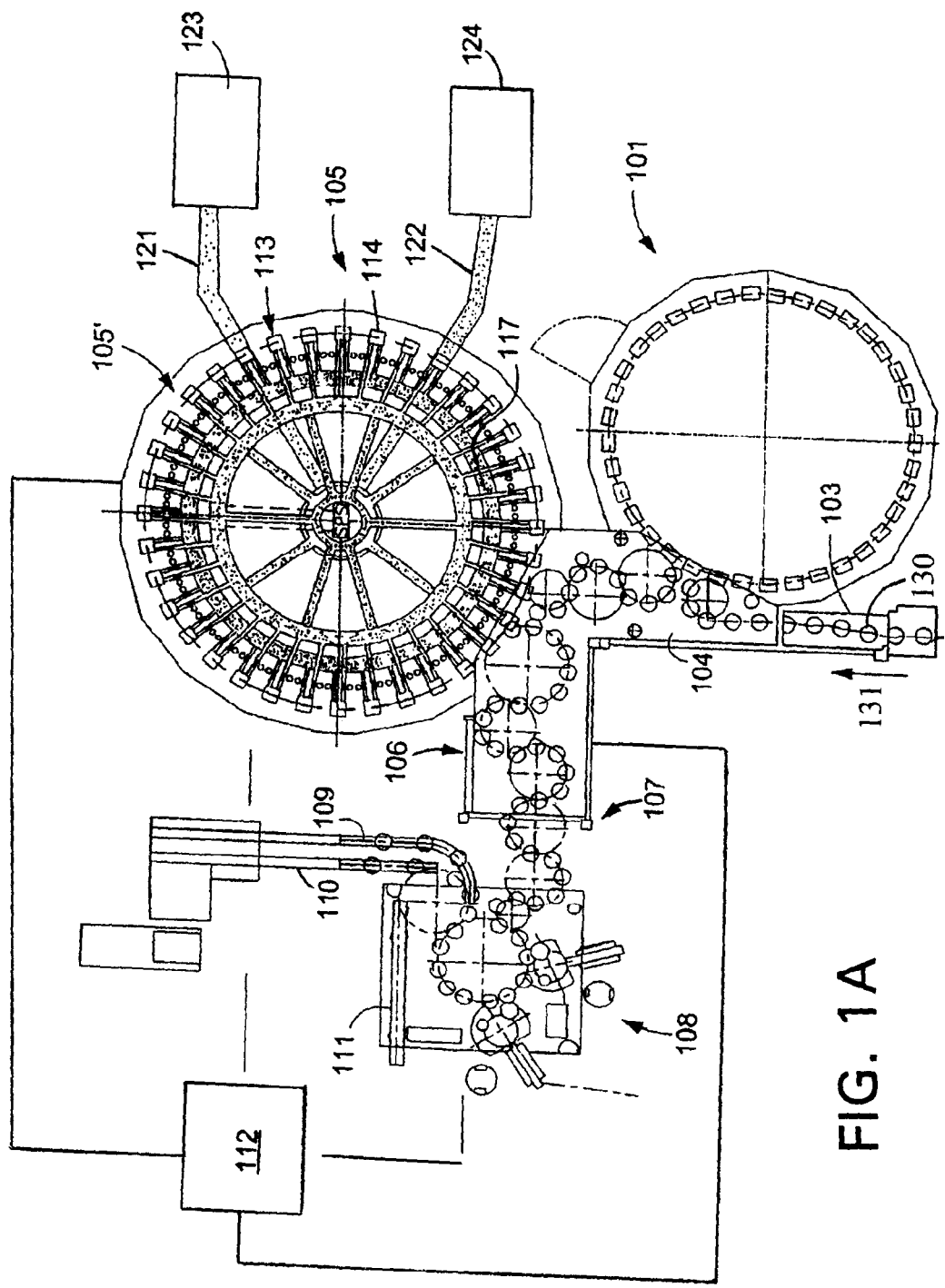
FIG. 1A shows schematically the main components of one possible embodiment example of a system for filling containers, for example, a beverage bottling plant for filling bottles with at least one liquid beverage, in accordance with at least one possible embodiment, in which system or plant could possibly be utilized at least one aspect, or several aspects, of the embodiments disclosed herein.

FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 113 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyer arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

FIG. 1 shows the device of the present application with two support frames 1, on which assembly templates 2 are fastened, which in turn carry side walls. Accordingly, the device is at the start of step d) of the method, the installation step during the assembly of a cleaning machine.

Each of the support frames 1 has a foot piece 3, which also stand to a common bracket and rail construction 4, the right support frame not being shown completely for reasons of clarity. The support frame 1 with the foot piece 3 is mounted so that it can be shifted toward the opposite support frame 1 and it can be fixed in various positions on a perforated strip 5 fastened to the bracket and rail construction 4. The side walls comprises an inner wall 6 and an outer wall 7, the inner wall 6 being held by means of a plurality of support elements 8 and spaced away from the outer wall 7. In the variant shown, the support elements 8 have a thread (not shown) at their outer end, so that during the installation the outer wall 7 can be screwed to the assembly template 2 and/or the support frame 1.

Furthermore, FIG. 1 shows a middle insert 9, which lies against the first side wall or the inner wall 6 and has been screwed together with this in a manner not shown, likewise via the support elements 8. The free end of this middle insert 9 rests on the free end of a support element 8 sticking out from the right side wall with spacing A, which is shown as a curved brace.

After the middle parts 9 have been installed, the right support frame 1 is shifted on the rail 4 toward the opposite support frame 1, until the middle parts lie against each other in frictional closure at both sides and can be welded together. In the example shown here, the laser welding occurs for the most part from the outside, for which the outer wall 7 has large access openings. These access openings are partially closed afterwards.

Figure 2:
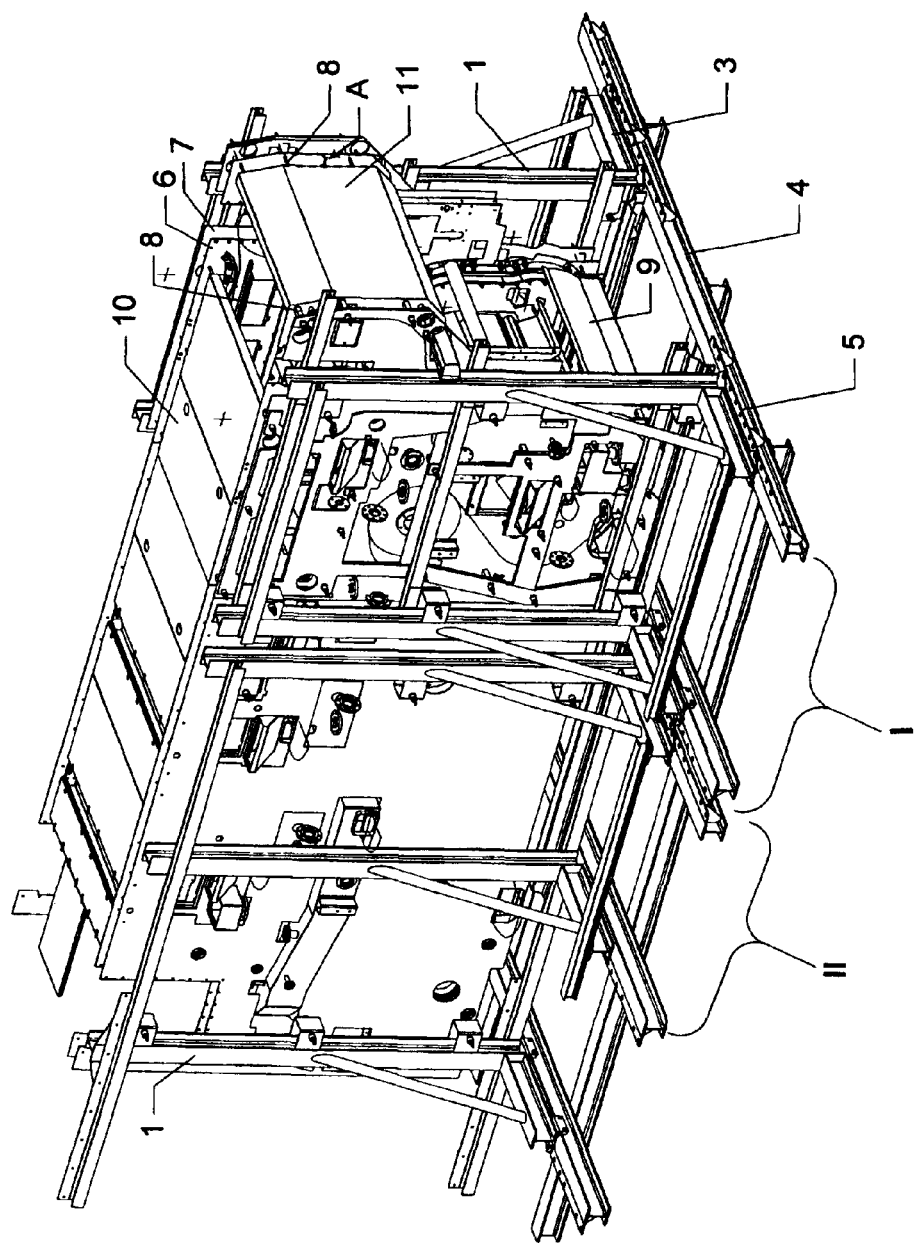
FIG. 2 shows a perspective representation of a section by section fabrication of a cleaning machine.

The cleaning machine shown in FIG. 2 is nearly finished. It has been fabricated section by section according to the aforementioned principle. The last segment I shown is already closed at the top, while the roof middle parts 10 and the front middle parts 11 rest on the free ends of the protruding support elements 8, as can be clearly seen. The cleaning machine is complemented with segment II and additional segments and no longer connected to the support frame 1; furthermore, the assembly templates 2 have been removed in these segments.

It will be appreciated that the method and the fabrication device can be used for a machine of any given length.

Figure 3:
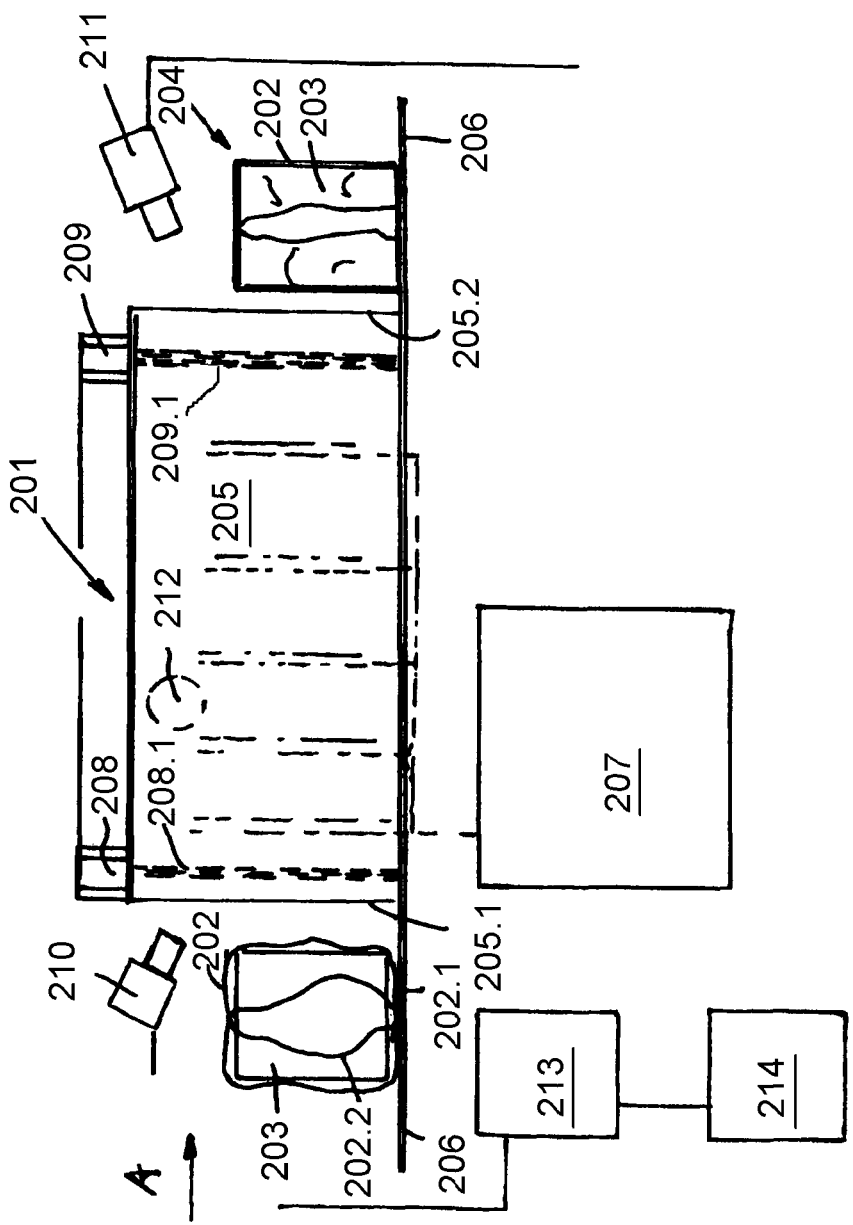
FIG. 3 is a simplified schematic side view of a shrink tunnel of a shrink wrap packaging plant;.

In FIG. 3, the number 201 designates in general the shrink tunnel of a shrink packager, i.e. of a plant for the shrinking of a shrink film 202 over a pack formation 203, and in at least one possible embodiment, for example, for the formation of packaging units or trading units 204 in which the individual packages that form the pack formation 203 can be held together by the shrunk shrink film 202.

The shrink tunnel 201 forms a tunnel interior 205 which is enclosed from the outside by a tunnel wall. The pack formations 202 which have already been wrapped with the shrink film 202 are moved through the tunnel interior 205 for the shrinking of the shrink film 202 under the action of heat and/or for the formation of the trading unit 204 by means of a conveyor, such as a conveyor belt 206, for example. For this purpose, the tunnel interior 205 is filled with hot air by a heating device 207, so that the temperature of at least two hundred degrees Celsius which is necessary and/or desired for the shrinking of the shrink film can be achieved.

At the tunnel entrance 205.1, from which the pack formation 203 provided with the shrink film 202 is moved by means of the conveyor 206 into the tunnel interior 205, and at the tunnel exit 205.2, at which the trading units 204 exit the tunnel interior 205, devices 208 and 209 respectively are provided on the upper side of the tunnel entrance and exit, and by means of which, by a vertical or essentially vertical flow of heated air, an air curtain 208.1 or 209.1 respectively is produced, and in at least one possible embodiment to close off or to enclose the tunnel interior 205 at the tunnel entrance 205.1 and tunnel exit 205.2.

For example, the devices 208 and 209 comprise essentially one or more slotted air discharge openings and corresponding blowers, which can be supplied with hot air from the heater device 207, for example. Outside the tunnel interior, a plurality of cameras 210 and 211 are provided, by means of which the tunnel interior 205 and/or the shrinking process that is taking place there can be monitored through the tunnel entrance 205.1 and the tunnel exit 205.2 respectively, and in one possible embodiment through the respective air curtains 208.1 and 209.1.

In the embodiment of the present application illustrated in FIG. 3, a video camera 210 is provided at the tunnel entrance 205.1 and at a sufficient distance from said entrance, and an additional video camera 211 is provided at the tunnel exit 205.2 at a sufficient distance from said exit, for example at a distance of one and half meters to two meters. Heat-resistant electric lamps 212 are used to illuminate the tunnel interior 205, although one of these lamps 212 is shown in FIG. 3 to simplify the illustration.

Through the air curtain 208.1, the video camera 210 monitors or optically records (for display) the first portion of the tunnel interior 205 adjacent to the tunnel entrance 205.1 in the direction of transport A, in which (portion of the tunnel) the decisive steps of the shrinking process take place, namely the sealing of the overlapping segments 202.1 of the shrink film 202 underneath the individual pack formation 203, the inflation of the shrink film over the lateral shrink holes 202.2 that are formed during the wrapping of the individual pack formation 203 and the initiation of the actual shrinking process by heating the individual piece of shrink film, in one possible embodiment on its inner surface that faces the respective pack formation 203. These initial steps of the shrinking process which are monitored or photographed by the video camera 210 already have a decisive effect on the subsequent optical appearance of the trading units 204 and/or the quality of the shrinking process. The step that immediately or substantially immediately follows these first steps of the shrinking process is the final shrinking of the shrink film. The video camera 211, through the air curtain 209.1, photographs the section of the tunnel interior 205 in the direction of transport A preceding the tunnel exit 205.2 and thus also the pack formations 203 or trading units 204 with the shrunk-on shrink film as well as the quality of the individual shrinking process.

The video cameras 210 and 211 are components of a camera or monitoring system which makes possible a variety of applications of the images taken by the cameras 210 and 211, e.g. among other things a display of the images on monitors 214, so that on the basis of these images, among other things, an optimal control of the shrinking process or an optical regulation of the shrink tunnel 201 and/or of the packing line of which this tunnel is a part becomes possible, in one possible embodiment including in the event of an exchange or replacement of the shrink film and/or a change in format, etc.

It is also possible to transmit images supplied by the cameras 210 and 211 that comprise information about errors that occur during the shrinkage process via the camera system 213 and a data transmission system, such as an Internet connection, for example, to a service company that is spatially or geographically remote from the process, such as to the service department of the manufacturer of the shrink tunnel 201, for example, to thereby receive a fast and targeted error analysis that makes it possible to resolve the error that has occurred.

For example, in at least one possible embodiment of the present application, several adjustments may be made to either, or both of, the shrink wrapping machine and the shrink tunnel 201 to alter the wrapped packaging units 204. In one possible embodiment, the speed of the conveyor 206 may be adjusted to a higher speed or a lower speed. This may influence the amount of time the packaging unit 204 spends in the shrink tunnel 201. Also, another adjustment may be made to the temperature of the shrink tunnel 201. The heating device 207 may either increase or decrease its output, and the air curtain-producing devices 208 and 209 may produce air curtains of differing temperatures, depending on the adjustments needed to be In at least one possible embodiment of the present application, the images recorded by the camera system during the shrinking process are transmitted directly, i.e. without any delay, to the other location, so that the shrinking process can be modified and monitored directly from this remote location. A technician skilled in the art speaks of a data transmission with no delay as an on-line transmission.

It is also possible to store the images or image data supplied by the cameras 210 and 211 for documentation purposes, so that these data can be retrieved if necessary and/or desired.

The above description assumes that two cameras 210 and 211 are provided outside the tunnel interior 205. Of course, there may also be a greater number of cameras and/or it may be sufficient to monitor the first portion of the tunnel interior 205.1 that is downstream of the tunnel entrance 205.1 in the direction of transport A, which is the portion of the tunnel in which the essential steps of the shrinking process occur, with one or with a plurality of cameras.

The present application relates to a production method for machines, in one possible embodiment machines for the beverage industry such as cleaning machines, pasteurization machines, shrink tunnels or the like, for the treatment of containers such as bottles, cans, jars, and the like, wherein the components of the machine are assembled from individual parts by welding processes and by releasable connections. A mounting fixture that is not part of the machine is provided, to which a first side wall is fastened, then a second, opposite side wall is positioned at a distance that is slightly greater than the distance between the side walls after complete assembly. In the next installation step, center built-in parts are installed between the side walls, wherein at least one of the side walls is provided with support elements by means of which a portion of the center built-ins are held and/or can be supported.

Finally, the mounting devices are brought together, so that the machine is enclosed and can subsequently be welded together by means of laser or electron beam welding methods.

One feature or aspect of an embodiment is believed at the time of the filing of this patent application to possibly reside broadly in a method for fabrication of machines, in one possible embodiment machines for the beverage industry like cleaning machines, pasteurization machines, shrink wrap tunnels or the like, wherein the structural parts of the machine are put together from individual parts and/or subassemblies by welding methods and by detachable connections, wherein at least the following steps are carried out:

a) preparing of a holding device not belonging to the machine, by means of which one of the side walls of the machine can be supported or carried, b) constructing and erecting at least one part of a first side wall of the machine, c) constructing and erecting at least one part of a second, opposite side wall of the machine at a distance which is slightly larger than the distance between the side walls when assembly is complete, d) positioning of middle structural parts between the side walls, at least one of the side walls having support elements by means of which at least some of the middle inserts can be held and/or carried by them (installation step), e) closing up the machine by pressing together the opposite side surfaces spanned by the middle inserts (closure step), and f) welding at least some of the middle inserts to the side surfaces, in one possible embodiment using a laser or electron beam welding method.

Another feature or aspect of an embodiment is believed at the time of the filing of this patent application to possibly reside broadly in the method, wherein the middle inserts in step d) are first fastened to one of the two side walls and are held loosely relative to the second, opposite side wall, which is slightly spaced apart, on its support elements.

Yet another feature or aspect of an embodiment is believed at the time of the filing of this patent application to possibly reside broadly in the method, wherein at least some of the weld connections are made by welding from the outside the middle inserts lying in abutment inside the machine through the containment wall, to it and/or to each other.

Still another feature or aspect of an embodiment is believed at the time of the filing of this patent application to possibly reside broadly in the method, wherein the first side wall comprises essentially two parallel or substantially parallel elements, an inner wall and an outer wall, the inner wall having a plurality of recesses and openings, through which the support elements can be passed and/or the inner and outer wall can be joined together, and which can carry and/or support the middle inserts per step d).

A further feature or aspect of an embodiment is believed at the time of the filing of this patent application to possibly reside broadly in the method, wherein the support elements are fastened to the outer wall or joined to it in a first step and then the inner wall is shoved onto the support elements.

Another feature or aspect of an embodiment is believed at the time of the filing of this patent application to possibly reside broadly in the method, wherein the side walls have recesses and openings before being assembled and at least some of the recesses and openings are produced in the side walls by means of a beam method and in one possible embodiment by means of electron beam or laser methods.

Yet another feature or aspect of an embodiment is believed at the time of the filing of this patent application to possibly reside broadly in the method, wherein, prior to the installation in step b) and/or c), dimensional marks and/or scored lines are made on one of the side walls by means of an electron beam and/or laser beam method.

Still another feature or aspect of an embodiment is believed at the time of the filing of this patent application to possibly reside broadly in the method, wherein the middle inserts are prefabricated components comprise several or a plurality of individual parts.

A further feature or aspect of an embodiment is believed at the time of the filing of this patent application to possibly reside broadly in the method, wherein the middle inserts and other inserted parts of the machine are installed essentially from bottom to top.

Another feature or aspect of an embodiment is believed at the time of the filing of this patent application to possibly reside broadly in machines for the beverage industry and food industry, in one possible embodiment cleaning machines, pasteurization machines, shrink wrap tunnels or the like, wherein these have at least one segment which has been fabricated by a method according to the present application and in one possible embodiment the machine has several segments which have been fabricated at the same time or in succession by a method according to the present application.

Yet another feature or aspect of an embodiment is believed at the time of the filing of this patent application to possibly reside broadly in the machine, wherein this has a plurality of support elements, on which at least one part of the middle inserts lie by at least one partial surface.

Still another feature or aspect of an embodiment is believed at the time of the filing of this patent application to possibly reside broadly in the machine, wherein these have a double wall and at least some of the support elements have a web region and a bracket region.

A further feature or aspect of an embodiment is believed at the time of the filing of this patent application to possibly reside broadly in the machine, wherein the support elements have a thread at least at one end.

One feature or aspect of an embodiment is believed at the time of the filing of this patent application to possibly reside broadly in the machine, wherein the support elements have a rivet head at least at one end.

Another feature or aspect of an embodiment is believed at the time of the filing of this patent application to possibly reside broadly in a device for the fabrication of machines for the beverage industry and food industry, in one possible embodiment a cleaning machine, a pasteurization machine, a shrink wrap tunnel for containers like bottles, glasses and the like, wherein it is suitable for carrying out a method according to the present application.

Yet another feature or aspect of an embodiment is believed at the time of the filing of this patent application to possibly reside broadly in the device, wherein this has a foot element and one side support frame for a single or double side wall.

Still another feature or aspect of an embodiment is believed at the time of the filing of this patent application to possibly reside broadly in the device, wherein an assembly template is placed on the at least one support frame, on which at least one bracket or support element is arranged.

A further feature or aspect of an embodiment is believed at the time of the filing of this patent application to possibly reside broadly in the device, wherein this has precisely or substantially precisely two opposite support frames and at least one foot element.

Another feature or aspect of an embodiment is believed at the time of the filing of this patent application to possibly reside broadly in the device, wherein an assembly template is likewise placed on the second support frame, on which at least one bracket or support element is arranged, there being in one possible embodiment a plurality of bracket or support elements.

Yet another feature or aspect of an embodiment is believed at the time of the filing of this patent application to possibly reside broadly in the device, wherein the one support frame or at least one of the support frames can move in order to bring the side walls closer together.

Still another feature or aspect of an embodiment is believed at the time of the filing of this patent application to possibly reside broadly in the device, wherein the one support frame or at least one of the support frames is guided by at least one rail.

A further feature or aspect of an embodiment is believed at the time of the filing of this patent application to possibly reside broadly in the device, wherein at least one of the assembly templates is mounted on at least one of the support frames with ability to move, in order to bring the side walls closer together.

One feature or aspect of an embodiment is believed at the time of the filing of this patent application to possibly reside broadly in a method of constructing a beverage bottle cleaning machine, a beverage bottle pasteurizing machine, and a beverage bottle shrink wrapping machine in a beverage bottling plant, said method comprising the steps of: adjusting the positioning of a first support device and a second support device adjustably mounted on a support frame opposite one another until said support devices are at a predetermined distance apart from one another; connecting a first side wall portion of said beverage bottle cleaning machine to support elements projecting from said first support device; supporting said first side wall portion of said beverage bottle cleaning machine in a vertical orientation with said first support device; connecting a second side wall portion of said beverage bottle cleaning machine to support elements projecting from said second support device to face said first side wall portion of said beverage bottle cleaning machine; supporting said second side wall portion of said beverage bottle cleaning machine in a vertical orientation with said second support device at a predetermined distance from said first side wall portion of said beverage bottle cleaning machine, which predetermined distance is larger than the distance between the side wall portions of said beverage bottle cleaning machine upon completion of assembly of said beverage bottle cleaning machine, to permit increased accessibility to the space between said side wall portions of said beverage bottle cleaning machine during installation of middle structural parts of said beverage bottle cleaning machine; positioning middle structural parts of said beverage bottle cleaning machine between said first side wall portion and said second side wall portion of said beverage bottle cleaning machine by fastening one end of said middle structural parts to one of said side wall portions of said beverage bottle cleaning machine and resting the other, free end on a support element of a corresponding one of said support devices supporting the other of said side wall portions of said beverage bottle cleaning machine, wherein the free ends are disposed a distance from the other of said side wall portions of said beverage bottle cleaning machine; upon positioning at least a substantial number of said middle structural parts between said first side wall portion and said second side wall portion of said beverage bottle cleaning machine, pressing said first side wall portion and said second side wall portion of said beverage bottle cleaning machine together to close the distance between the free ends of said middle structural parts and their adjacent, corresponding side wall portion of said beverage bottle cleaning machine; welding at least some of said middle structural parts to said first side wall portion and said second side wall portion of said beverage bottle cleaning machine by using a laser or electron beam welding method; removing the assembled beverage bottle cleaning machine from said support frame and installing said beverage bottle cleaning machine in a beverage bottling plant; adjusting the positioning of said first support device and said second support device adjustably mounted on said support frame opposite one another until said support devices are at a predetermined distance apart from one another; connecting a first side wall portion of said beverage bottle pasteurizing machine to support elements projecting from said first support device; supporting said first side wall portion of said beverage bottle pasteurizing machine in a vertical orientation with said first support device; connecting a second side wall portion of said beverage bottle pasteurizing machine to support elements projecting from said second support device to face said first side wall portion of said beverage bottle pasteurizing machine; supporting said second side wall portion of said beverage bottle pasteurizing machine in a vertical orientation with said second support device at a predetermined distance from said first side wall portion of said beverage bottle pasteurizing machine, which predetermined distance is larger than the distance between the side wall portions of said beverage bottle pasteurizing machine upon completion of assembly of said beverage bottle pasteurizing machine, to permit increased accessibility to the space between said side wall portions of said beverage bottle pasteurizing machine during installation of middle structural parts of said beverage bottle pasteurizing machine; positioning middle structural parts of said beverage bottle pasteurizing machine between said first side wall portion and said second side wall portion of said beverage bottle pasteurizing machine by fastening one end of said middle structural parts to one of said side wall portions of said beverage bottle pasteurizing machine and resting the other, free end on a support element of a corresponding one of said support devices supporting the other of said side wall portions of said beverage bottle pasteurizing machine, wherein the free ends are disposed a distance from the other of said side wall portions of said beverage bottle pasteurizing machine; upon positioning at least a substantial number of said middle structural parts between said first side wall portion and said second side wall portion of said beverage bottle pasteurizing machine, pressing said first side wall portion and said second side wall portion of said beverage bottle pasteurizing machine together to close the distance between the free ends of said middle structural parts and their adjacent, corresponding side wall portion of said beverage bottle pasteurizing machine; welding at least some of said middle structural parts to said first side wall portion and said second side wall portion of said beverage bottle pasteurizing machine by using a laser or electron beam welding method; removing the assembled beverage bottle pasteurizing machine from said support frame and installing said beverage bottle pasteurizing machine in a beverage bottling plant; adjusting the positioning of said first support device and said second support device adjustably mounted on said support frame opposite one another until said support devices are at a predetermined distance apart from one another; connecting a first side wall portion of said beverage bottle shrink wrapping machine to support elements projecting from said first support device; supporting said first side wall portion of said beverage bottle shrink wrapping machine in a vertical orientation with said first support device; connecting a second side wall portion of said beverage bottle shrink wrapping machine to support elements projecting from said second support device to face said first side wall portion of said beverage bottle shrink wrapping machine; supporting said second side wall portion of said beverage bottle shrink wrapping machine in a vertical orientation with said second support device at a predetermined distance from said first side wall portion of said beverage bottle shrink wrapping machine, which predetermined distance is larger than the distance between the side wall portions of said beverage bottle shrink wrapping machine upon completion of assembly of said beverage bottle shrink wrapping machine, to permit increased accessibility to the space between said side wall portions of said beverage bottle shrink wrapping machine during installation of middle structural parts of said beverage bottle shrink wrapping machine; positioning middle structural parts of said beverage bottle shrink wrapping machine between said first side wall portion and said second side wall portion of said beverage bottle shrink wrapping machine by fastening one end of said middle structural parts to one of said side wall portions of said beverage bottle shrink wrapping machine and resting the other, free end on a support element of a corresponding one of said support devices supporting the other of said side wall portions of said beverage bottle shrink wrapping machine, wherein the free ends are disposed a distance from the other of said side wall portions of said beverage bottle shrink wrapping machine; upon positioning at least a substantial number of said middle structural parts between said first side wall portion and said second side wall portion of said beverage bottle shrink wrapping machine, pressing said first side wall portion and said second side wall portion of said beverage bottle shrink wrapping machine together to close the distance between the free ends of said middle structural parts and their adjacent, corresponding side wall portion of said beverage bottle shrink wrapping machine; welding at least some of said middle structural parts to said first side wall portion and said second side wall portion of said beverage bottle shrink wrapping machine by using a laser or electron beam welding method; and removing the assembled beverage bottle shrink wrapping machine from said support frame and installing said beverage bottle shrink wrapping machine in a beverage bottling plant.

Another feature or aspect of an embodiment is believed at the time of the filing of this patent application to possibly reside broadly in a beverage container cleaning machine, a beverage container pasteurizing machine, or a beverage container shrink tunnel machine made by the process according to the present application.

Yet another feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein said steps of positioning further comprise: fastening said middle structural parts to said first side wall portion; and supporting said middle structural parts with support elements of said second side wall portion.

Still another feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein said steps of welding further comprise welding said middle structural parts using a laser or electron beam welding method to said first side wall portion and said second side wall portion through said first side wall portion and said second side wall portion.

A further feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein: said first side wall portion comprises an inner wall and an outer wall; said inner wall is configured to be substantially parallel with said outer wall; said inner wall comprises a plurality of recesses and openings, through which support elements may be passed; and said support elements are configured to support said middle structural parts.

Another feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein method further comprises: fastening said support elements to said outer wall; and then shoving said inner wall onto said support elements.

Yet another feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein: said first side wall portion and said second side wall portion comprise recesses and openings prior to assembly of said beverage bottle cleaning machine, said beverage bottle pasteurizing machine, and said beverage bottle shrink wrapping machine; and said method further comprises producing recesses and openings in said first side wall portion and said second side wall portion by means of a beam method, which beam method may comprise at least one of: an electron beam method or a laser method.

Still feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein said method further comprises making dimensional marks and/or scored lines on said first side wall portion and said second side wall portion by means of a beam method, which beam method may comprise at least one of: an electron beam method or a laser method.

A further feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant, wherein: said middle structural parts further comprise preassembled components, which preassembled components comprise a plurality of individual parts; and said method further comprises installing said middle structural parts first at the bottom of said side wall portions and then at the top of said side wall portions.

Another feature or aspect of an embodiment is believed at the time of the filing of this patent application to possibly reside broadly in the method of constructing a beverage bottle cleaning machine, a beverage bottle pasteurizing machine, and a beverage bottle shrink wrapping machine in a beverage bottling plant with said support frame, wherein: said support frame comprises: at least one foot element; at least one support device configured to permit mounting of an assembly template, on which assembly template at least one support element is arranged; a first support device and a second support device, which second support device is disposed opposite said first support device; said at least one support device is configured to be movable, to permit said first side wall portion and said second side wall portion to be pressed together; and at least one rail configured to guide said at least one support device; and said method further comprises: mounting at least one assembly template on said at least one support device of said support frame; moving said first side wall portion and said second side wall portion together on said support frame; and guiding said at least one support device.

Yet another feature or aspect of an embodiment is believed at the time of the filing of this patent application to possibly reside broadly in a method of constructing a beverage container handling machine, such as a beverage container cleaning machine, a beverage container pasteurization machine, and a beverage container shrink wrapping machine, said method comprising the steps of: adjusting the positioning of a first support device and a second support device adjustably mounted on a support frame opposite one another until said support devices are at a predetermined distance apart from one another; connecting a first side wall portion of said beverage container handling machine to support elements projecting from said first support device; supporting said first side wall portion in a vertical orientation with said first support device; connecting a second side wall portion of said beverage container handling machine to support elements projecting from said second support device to face said first side wall portion; supporting said second side wall portion in a vertical orientation with said second support device at a predetermined distance from said first side wall portion, which predetermined distance is larger than the distance between the side wall portions upon completion of assembly of said beverage container handling machine, to permit increased accessibility to the space between said side wall portions during installation of middle structural parts of said beverage container handling machine; positioning middle structural parts between said first side wall portion and said second side wall portion; upon positioning at least some of said middle structural parts between said first side wall portion and said second side wall portion, pressing said first side wall portion and said second side wall portion together with said middle structural parts spanning the distance there between; welding at least some of said middle structural parts to said first side wall portion and said second side wall portion; and removing the assembled beverage container handling machine from said support frame.

Still another feature or aspect of an embodiment is believed at the time of the filing of this patent application to possibly reside broadly in a beverage container handling machine, such as a beverage container cleaning machine, a beverage container pasteurizing machine, or a beverage container shrink tunnel machine, made by the process according to the present application.

A further feature or aspect of an embodiment is believed at the time of the filing of this patent application to possibly reside broadly in the method of constructing a beverage container handling machine, wherein said step of positioning further comprises: fastening said middle structural parts of said beverage container handling machine to said first side wall portion; and supporting said middle structural parts of said beverage container handling machine with support elements of said second side wall portion.

One feature or aspect of an embodiment is believed at the time of the filing of this patent application to possibly reside broadly in the method of constructing a beverage container handling machine, wherein said step of welding further comprises welding said middle structural parts of said beverage container handling machine using a laser or electron beam welding method to said first side wall portion and said second side wall portion through said first side wall portion and said second side wall portion.

Another feature or aspect of an embodiment is believed at the time of the filing of this patent application to possibly reside broadly in the method of constructing a beverage container handling machine, wherein: said first side wall portion comprises an inner wall and an outer wall; said inner wall is configured to be substantially parallel with said outer wall; said inner wall comprises a plurality of recesses and openings, through which support elements may be passed; and said support elements are configured to support said middle structural parts of said beverage container handling machine.

Yet another feature or aspect of an embodiment is believed at the time of the filing of this patent application to possibly reside broadly in the method of constructing a beverage container handling machine, wherein method further comprises: fastening said support elements to said outer wall; and then shoving said inner wall onto said support elements.

Still another feature or aspect of an embodiment is believed at the time of the filing of this patent application to possibly reside broadly in the method of constructing a beverage container handling machine, wherein: said first side wall portion and said second side wall portion comprise recesses and openings prior to assembly of said beverage container handling machine; and said method further comprises producing recesses and openings in said first side wall portion and said second side wall portion by means of a beam method, which beam method may comprise at least one of: an electron beam method or a laser method.

A further feature or aspect of an embodiment is believed at the time of the filing of this patent application to possibly reside broadly in the method of constructing a beverage container handling machine, wherein said method further comprises making dimensional marks and/or scored lines on said first side wall portion and said second side wall portion by means of a beam method, which beam method may comprise at least one of: an electron beam method or a laser method.

Another feature or aspect of an embodiment is believed at the time of the filing of this patent application to possibly reside broadly in the method of constructing a beverage container handling machine, wherein: said middle structural parts of said beverage container handling machine further comprise preassembled components, which preassembled components comprise a plurality of individual parts; and said method further comprises installing said middle structural parts of said beverage container handling machine first at the bottom of said beverage container handling machine and then at the top of said beverage container handling machine.

Yet another feature or aspect of an embodiment is believed at the time of the filing of this patent application to possibly reside broadly in the method of constructing a beverage container handling machine with said support frame, wherein: said support frame comprises: at least one foot element; at least one support device configured to permit mounting of an assembly template, on which assembly template at least one support element is arranged; a first support device and a second support device, which second support device is disposed opposite said first support device; said at least one support device is configured to be movable, to permit said first side wall portion and said second side wall portion to be pressed together; and at least one rail configured to guide said at least one support device; and said method further comprises: mounting at least one assembly template on said at least one support device of said support frame; moving said first side wall portion and said second side wall portion together on said support frame; and guiding said at least one support device.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Jun. 26, 2008, and/or cited elsewhere are hereby incorporated by reference as if set forth in their entirety herein as follows: EP 1,008,510, having the title "Production of vehicles," published on Jun. 14, 2000; GB 2,427,175, having the title "Assembly method for your vehicle," published on Dec. 20, 2006; GB 1,601,603, having the title "IMPROVEMENTS IN OR RELATING TO THE ROLLER ASSEMBLY ACCESSORIES FOR PRINTING MACHINES," published Nov. 4, 1981; EP 1,331,059, having the following English translation of the German title, "Fastening device for containers and processes for clamping, positioning and processing containers, barrels, cauldrons, tubes and similar using such a fastening device," published on Jul. 30, 2003; and U.S. Pat. No. 5,035,046, having the title "Device for assembling louver windows and doors," published on Jul. 30, 1991.

All of the patents, patent applications or patent publications, which were cited in the German Office Action dated May 8, 2007, and/or cited elsewhere are hereby incorporated by reference as if set forth in their entirety herein as follows: DE 34 33 445, having the following English translation of the German title, "Process for producing a box-shaped storage and transportation container and equipment for carrying out said process," published on Mar. 20, 1986.

Some examples of apparatus and methods of sterilizing or cleaning containers that may possibly be utilized or possibly adapted for use in at least one possible embodiment of the present application may possibly be found in the following U.S. Patents: U.S. Pat. No. 5,092,356 issued to Grot on Mar. 3, 1992; U.S. Pat. No. 5,320,144 issued to Ahlers on Jun. 14, 1994; U.S. Pat. No. 5,533,552 issued to Ahlers on Jul. 9, 1996; U.S. Pat. No. 5,558,135 issued to Kronseder et al. on Sep. 24, 1996; and U.S. Pat. No. 5,896,899 issued to Schlitz on Apr. 27, 1999.

Some examples of shrink wrapping machines or machines for wrapping items in plastic film which may possibly be utilized or adapted for use in at least one possible embodiment may possibly be found in the following U.S. Patents: U.S. Pat. No. 6,826,893, entitled "Apparatus for wrapping products with plastic film;" U.S. Pat. No. 6,739,115, entitled "Equipment for wrapping groups of products in plastic film;" U.S. Pat. No. 5,878,555, entitled "Apparatus for wrapping articles in plastic film;" U.S. Pat. No. 5,787,691, entitled "Apparatus for wrapping articles in plastic film;" U.S. Pat. No. 5,519,983, entitled "Shrink wrap packaging system with an ultrasonic side sealer;" U.S. Pat. No. 4,956,963, entitled "Method of sealing a shrink wrap package;" U.S. Pat. No. 4,873,814, entitled "Method of making a shrink wrap package;" U.S. Pat. No. 4,214,419, entitled "Collating and shrink wrap packaging apparatus;" U.S. Pat. No. 6,484,475, entitled "Modular packaging machine;" U.S. Pat. No. 4,694,633, entitled "Film wrapping machine;" U.S. Pat. No. 4,118,916, entitled "Thermoplastic wrapping machine;" U.S. Pat. No. 4,118,916, entitled "Thermoplastic wrapping machine;" U.S. Pat. No. 5,371,999, entitled "Shrink film wrapping machine;" U.S. Pat. No. 4,748,795, entitled "Film wrapping machine;" and U.S. Pat. No. 5,115,620, entitled "Wrapping machine."

Some examples of bottling plants comprising pasteurizing or treatment devices which may possibly be utilized or adapted for use in at least one possible embodiment of the present application may possibly be found in the following U.S. Patents: U.S. Pat. No. 7,513,092, having the title "Beverage bottling plant for filling bottles with a liquid beverage filling material, and a method for the operation thereof," published on Apr. 7, 2009; U.S. Pat. No. 6,834,473, having the title "Bottling plant and method of operating a bottling plant and a bottling plant with sections for stabilizing the bottled product," published on Dec. 28, 2004; and U.S. Pat. No. 6,374,575, having the title "Bottling plant and method of operating a bottling plant," published on Apr. 23, 2002.

The patents, patent applications, and patent publication listed above in the preceding five paragraphs are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 019 378.7, filed on Apr. 23, 2007, having inventors Klaus JENDRICHOWSKI and Ulrich WIEDEMANN, and DE-OS 10 2007 019 378.7 and DE-PS 10 2007 019 378.7, and International Application No. PCT/EP2008/002138, filed on Mar. 18, 2008, having WIPO Publication No. WO 2008/128607 and inventors Klaus JENDRICHOWSKI and Ulrich WIEDEMANN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2008/002138 and German Patent Application 10 2007 019 378.7, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2008/002138 and DE 10 2007 019 378.7 from which this patent application claims priority which do not have to do with the correction of the translation in this patent application are not to be included in this patent application in the incorporation by reference.

Any statements about admissions of prior art in the original foreign patent applications PCT/EP2008/002138 and DE 10 2007 019 378.7 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of constructing a beverage container handling machine, said method comprising:
   holding separate first and second walls of said beverage container handling machine opposite one another in a holding structure not part of said beverage container handling machine;
   positioning middle structural parts of said beverage container handling machine between said first and second walls by holding and/or supporting said middle structural parts using support elements, which are part of at least one of said first and second walls;
   moving at least one said first and second walls to close the distance between said first and second walls and enclosed said middle structural parts, and thereby connecting said first and second walls; and
   connecting at least one of said middle structural parts to at least one of said first and second walls.

2. The method according to claim 1, wherein said beverage container handling machine comprises a cleaning machine configured to clean beverage containers.

3. The method according to claim 1, wherein said beverage container handling machine comprises a pasteurizing machine configured to pasteurize a beverage in beverage containers.

4. The method according to claim 1, wherein said beverage container handling machine comprises a shrink wrapping machine configured to shrink-wrap groups of beverage containers.

5. The method according to claim 1, wherein said step of connecting comprises one of: welding, laser beam welding, or electron beam welding.

6. The method according to claim 5, wherein said step of positioning said middle structural parts comprises securing said middle structural parts to said first wall and loosely holding said middle structural parts with said support elements that are part of said second wall.

7. The method according to claim 6, wherein said step of connecting comprises placing said at least one of said middle structural parts flush against an interior surface of one of said first and second walls, then directing a laser beam or electron beam at an adjacent exterior surface of said wall, and then welding, through said wall, said at least one of said middle structural parts to said wall, or said at least one of said middle structural parts and said wall to each other.

8. The method according to claim 7, wherein:
   at least one of said first and second walls comprises an inner wall and an outer wall that are substantially parallel to one another; and
   said inner wall comprises recesses and openings that are configured to at least one of: permit the passage of said support elements therethrough, interconnect said inner wall and said outer wall, and support said middle structural parts.

9. The method according to claim 8, wherein said method further comprises securing or connecting said support elements to said outer wall, and then pushing said inner wall onto said support elements.

10. The method according to claim 9, wherein said method further comprises:
    forming at least part of said recesses and openings using an electron beam method or a laser beam method; and
    forming at least one of: dimensioning lines and tear lines on at least one of said first and second walls using an electron beam method or a laser beam method.

11. The method according to claim 10, wherein:
    a plurality of said middle structural parts are prefabricated components comprising a plurality of individual parts; and
    said step of positioning said middle structural parts comprises positioning said middle structural parts beginning adjacent the bottom of said first and second walls and then proceeding upwardly and finishing adjacent the top of said first and second walls.

* * * * *